(12) United States Patent
Wang et al.

(10) Patent No.: US 9,044,100 B1
(45) Date of Patent: Jun. 2, 2015

(54) BED FRAME

(71) Applicants: George Wang, City of Industry, CA (US); Lei Yang, City of Industry, CA (US)

(72) Inventors: George Wang, City of Industry, CA (US); Lei Yang, City of Industry, CA (US)

(73) Assignee: FURNITURE OF AMERICA, INC., City of Industry, CA (US)

( * ) Notice: Subject to any disclaimer, the term of this patent is extended or adjusted under 35 U.S.C. 154(b) by 0 days.

(21) Appl. No.: 14/179,511

(22) Filed: Feb. 12, 2014

(51) Int. Cl.
*A47C 19/20* (2006.01)
*A47C 19/02* (2006.01)
*F16B 12/56* (2006.01)

(52) U.S. Cl.
CPC .............. *A47C 19/20* (2013.01); *A47C 19/025* (2013.01); *A47C 19/024* (2013.01); *A47C 19/022* (2013.01); *F16B 12/56* (2013.01)

(58) Field of Classification Search
CPC .......... F16B 12/44; F16B 12/54; F16B 12/56; F16B 2012/403; F16B 2012/406; F16B 2012/443; F16B 2012/446
USPC ............ 5/8, 9.1, 132, 200.1, 201, 282.1, 285, 5/288, 291, 298, 301, 304; 403/171, 176, 403/378, 379
See application file for complete search history.

(56) References Cited

U.S. PATENT DOCUMENTS

| | | | | |
|---|---|---|---|---|
| 895,898 | A | * | 8/1908 | Scheer ................................ 5/9.1 |
| 1,275,774 | A | * | 8/1918 | Silvester ............................ 5/9.1 |
| 2,478,088 | A | * | 8/1949 | Causey ............................ 52/637 |
| 3,886,604 | A | * | 6/1975 | Ewing .................................... 5/8 |
| 4,090,798 | A | * | 5/1978 | Barton .......................... 403/171 |
| 5,500,963 | A | * | 3/1996 | Yeh .................................... 5/9.1 |
| 5,517,928 | A | * | 5/1996 | Erdman ........................ 108/180 |
| 5,694,656 | A | * | 12/1997 | Huang ............................... 5/290 |
| 6,314,595 | B1 | * | 11/2001 | Price .................................. 5/201 |
| 6,581,221 | B2 | * | 6/2003 | Rosenquist ........................ 5/9.1 |
| 7,111,341 | B2 | * | 9/2006 | Hennings et al. ................. 5/201 |
| 2005/0050633 | A1 | * | 3/2005 | Rogers ............................... 5/9.1 |

FOREIGN PATENT DOCUMENTS

FR 2442030 * 6/1980 ............. A47C 19/00

* cited by examiner

*Primary Examiner* — Michael Trettel
(74) *Attorney, Agent, or Firm* — Raymond Y. Chan; David and Raymond Patent Firm

(57) ABSTRACT

A bed frame includes a longitudinal supporting member, a joint arrangement, an upper tubular member having a receiving portion and an upper connecting hole, a lower tubular member having an inserting portion and a lower connecting hole, wherein the inserting portion of the lower tubular member is slidably inserted into the receiving portion of the upper tubular member at a position that the upper and lower connecting holes are coaxially aligned with each other. The joint arrangement includes a frame locker provided at an end of the longitudinal supporting member and an elongated fastener extended through the upper and lower connecting holes to securely fasten with the frame locker so as to securely lock up the upper tubular member, the lower tubular member, and the bed support together.

20 Claims, 4 Drawing Sheets

BED FRAME

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a bed frame, and more particularly to a bed frame with a joint arrangement for securely and rapidly connecting different frame structures of the bed frame.

2. Description of Related Arts

An existing bed generally consists of a mattress on a bed frame. One type of bed is a bunk bed generally comprising a bed frame stacked on top of another for allowing two or more users to sleep. The advantage of bunk bed is that multiple bed frames can be place in the same room while maximizing the available floor space. Therefore, bunk bed can be easily found and used in dormitory or kids' room.

In particular, the bunk beds comprises an upper deck frame, a lower deck frame, and four supporting posts coupled between the upper and lower deck frames to support the upper deck frame on top of the lower deck frame. Accordingly, at least one of the upper and lower deck frames is a bed frame. For example, the upper and lower deck frames are two bed frames that two or more users can sleep on the bed frames respectively. Likewise, only the upper deck frame is a bed frame while the lower deck frame is a workplace such that the user is able to work at the workplace and to sleep at the upper deck frame.

In order to reduce the size of the bunk bed for storage and shipping, the bunk bed usually can be disassembled. Generally speaking, the bunk bed further comprises a plurality of frame joints for detachably fastening the upper and lower deck frames to the supporting posts and a plurality of post fasteners for detachably coupling with the supporting posts in order to disassemble each supporting post into an upper post and a lower post. The frame joints are arranged for connecting the corners of each of the upper and lower deck frames to the supporting posts respectively. The post fasteners are connected to the supporting posts between the upper and lower deck frames.

In other words, in order to assemble the bunk bed, the user must attach the upper posts to the lower posts via the post fasteners to form the supporting posts and then couple the upper and lower deck frames to the supporting posts via the frame joints.

Accordingly, each supporting post has a hollow structure, wherein the upper and lower posts are coaxially coupled with each other to form the supporting post. In order to coaxially insert the lower post into the upper post, an upper end portion of the lower post is configured in a taper structure to have a smaller diameter. Therefore, the upper end portion of the lower post can be slidably inserted into the lower end portion of the upper post. Then, the post fastener can affix to the lower end portion of the upper post through the upper end portion of the lower post in order to couple the upper and lower posts with each other.

The above mentioned bed frame has several disadvantages. The connection between the deck frame and the supporting post and the connection between the upper and lower posts are not stable and strong enough to withstand any lateral force directly exerting thereon. It is worth mentioning that a clearance must be formed between two different components in order to connect two different components with each other. Therefore, while the lateral force is exerted on the deck frame, the overall structure of the bunk bed will be wobbled due to the clearance, and even collapses to cause serious accidents.

Furthermore, since the connection between the upper and lower posts is formed at the supporting post between the upper and lower deck frames, the rigidity of the supporting post will be substantially weakened. It is worth mentioning that the supporting posts are supposed to support the upper deck frame above the lower deck frame. Any joint formed at the supporting post between the upper and lower deck frames will create any clearance and will cause the unwanted wobbling movement at the supporting post.

Furthermore, the connection method for the above mentioned bunk bed is difficult to implement. It is difficult to assemble such bunk bed by one person. In other words, lots of time may be needed to assemble the deck frames and supporting posts together, which is less efficiency and time-consuming. Therefore, in order to overcome the above mentioned disadvantages, a bed frame which is easy to assemble and stable in structure is highly desired.

SUMMARY OF THE PRESENT INVENTION

A main object of the present invention is to provide a bed frame, which comprises a joint arrangement for securely and rapidly connecting different frame structures of the bed frame.

Another object of the present invention is to provide the bed frame, wherein the joint arrangement is arranged to securely connect the upper tubular member, the lower tubular member, and the bed support together, such that the joint arrangement provides a simple locking structure to lock up three different bed components together.

Another object of the present invention is to provide the bed frame, wherein the joint arrangement can substantially lock up the upper and lower tubular members with each other to prevent any unwanted rotational movement therebetween and to minimize the clearance therebetween due to the diameter difference.

Another object of the present invention is to provide the bed frame, wherein the joint arrangement can substantially evenly distribute the force from the bed support to the upper and lower supporting frames.

Another object of the present invention is to provide the bed frame, wherein the joint arrangement can substantially minimize the clearance at the connecting point among the upper tubular member, the lower tubular member, and the bed support for preventing any wobbling movement of the bed frame due to the clearance.

Another advantage of the invention is to provide a bed frame, wherein the joint arrangement is adapted to incorporate with any bed frame having upper and lower tubular members.

Another object of the present invention is to provide the bed frame, which can be easily assembled by one person and can be disassembled to reduce the size of the bed frame for storage and shipping.

Another advantage of the invention is to provide a bed frame, wherein the joint arrangement does not involve complicated mechanical structures or expensive components so as to minimize the manufacturing cost of the present invention.

Another object of the present invention is to provide the bed frame with joint arrangements, wherein no expensive or complicated structure is required to employ in the present invention in order to achieve the above mentioned objects. Therefore, the present invention successfully provides an economic and efficient solution for providing a joint arrangement of the bed frame to secure three different bed components in one single locking configuration.

Additional advantages and features of the invention will become apparent from the description which follows, and may be realized by means of the instrumentalities and combinations particular point out in the appended claims.

Accordingly, in order to achieve the above objects, the present invention provides a bed frame, comprising:

an upper supporting frame which comprises an upper tubular member having a receiving portion and at least an upper connecting hole formed at a surrounding wall of the receiving portion;

a lower supporting frame which comprises a lower tubular member having an inserting portion and at least a lower connecting hole formed at a surrounding wall of the inserting portion, wherein the inserting portion of the lower tubular member is slidably inserted into the receiving portion of the upper tubular member at a position that the upper and lower connecting holes are coaxially aligned with each other;

a bed support comprising a longitudinal supporting member; and a joint arrangement which comprises a frame locker provided at an end of the longitudinal supporting member and an elongated fastener extended through the upper and lower connecting holes to securely fasten with the frame locker so as to securely lock up the upper tubular member, the lower tubular member, and the bed support together.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
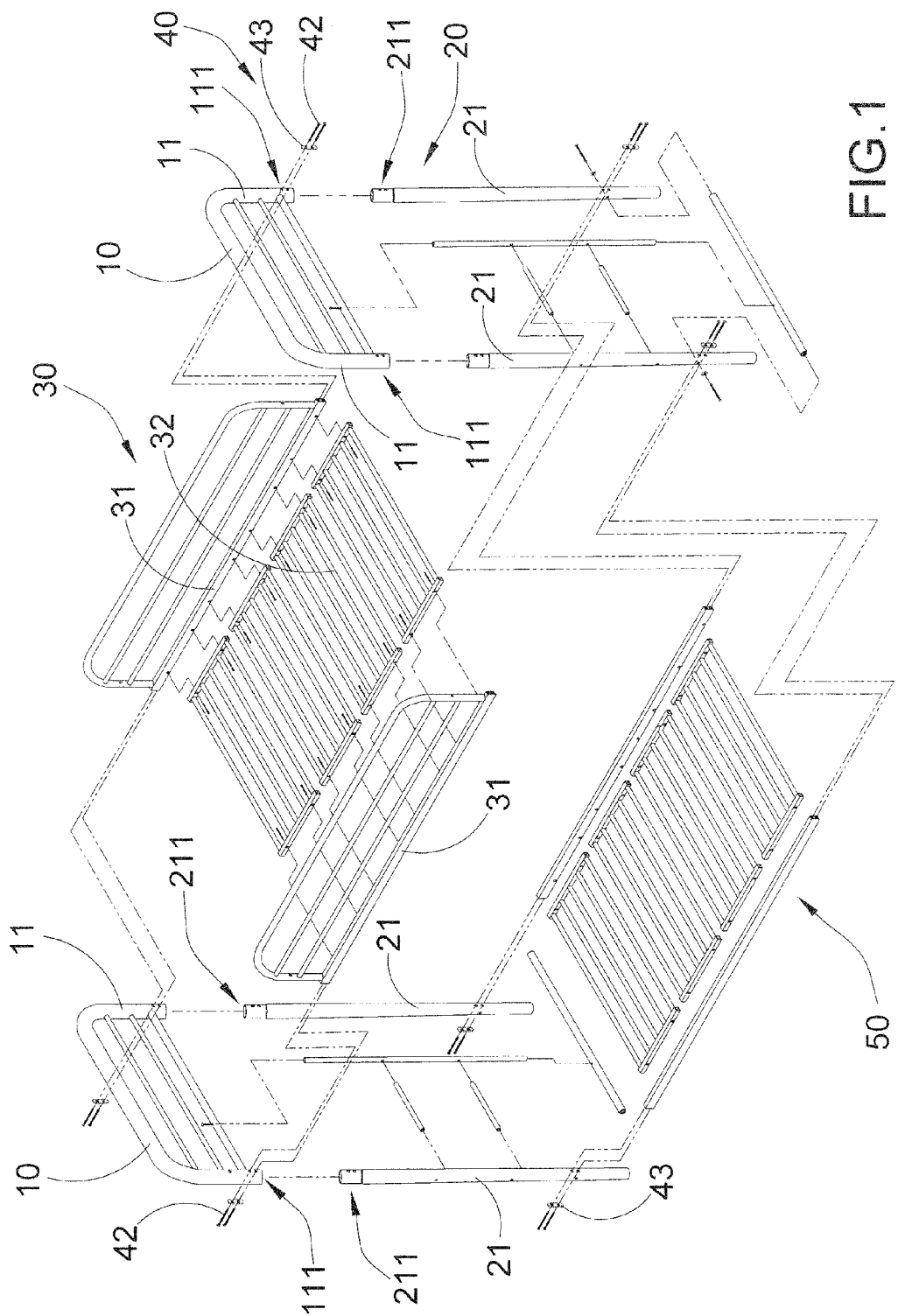
FIG. 1 is an exploded perspective view of a bed frame according to a preferred embodiment of the present invention.
Figure 2:
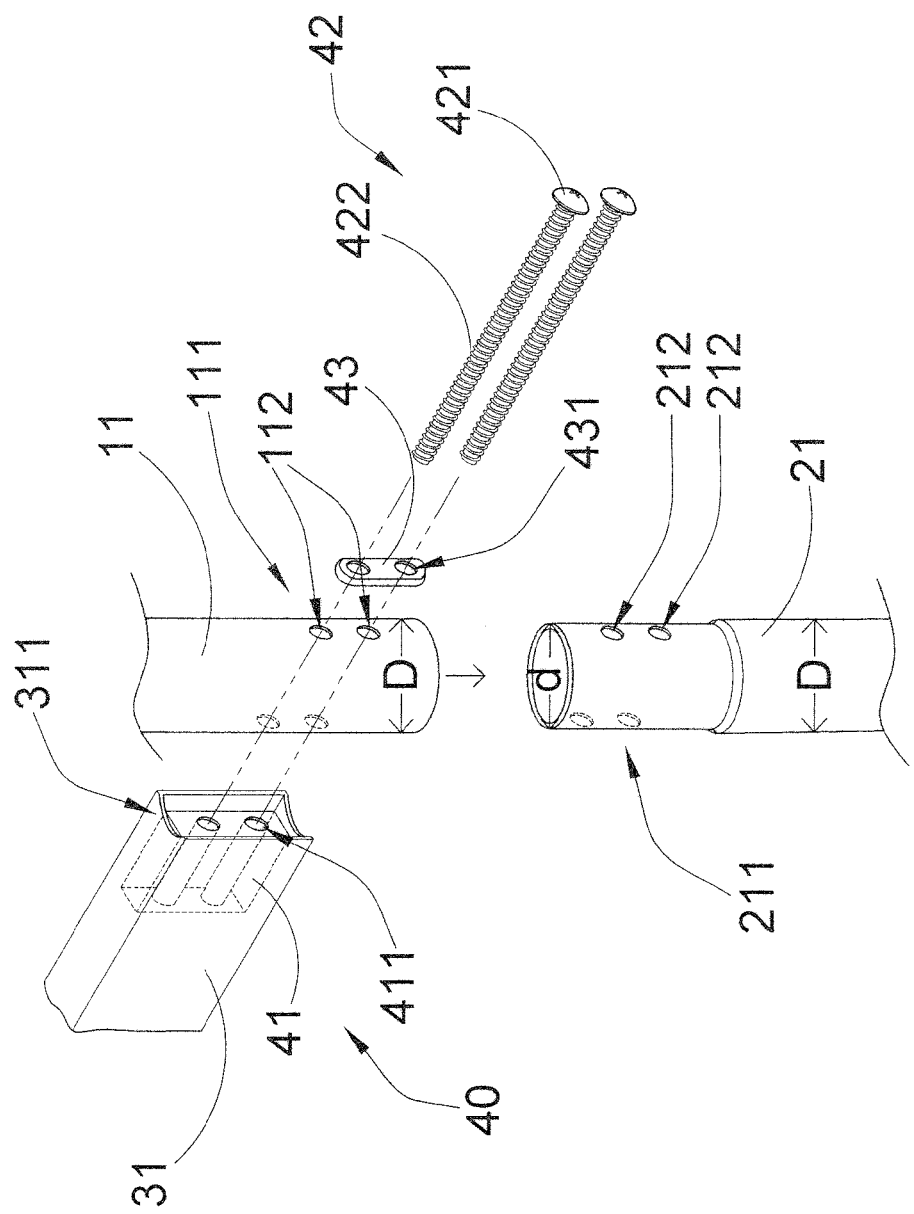
FIG. 2 is a prospective view of a joint arrangement of the bed frame according to the above preferred embodiment of the present invention.

Referring to FIGS. 1 and 2 of the drawings, a bed frame according to a preferred embodiment of the present invention is illustrated, wherein the bed frame comprises an upper supporting frame 10, a lower supporting frame 20, and a bed supporting frame 30.

According to the preferred embodiment, the upper supporting frame 10 comprises an upper tubular member 11 having a receiving portion 111 and at least an upper connecting hole 112 formed at a surrounding wall of the receiving portion 11. The lower supporting frame 20 comprises a lower tubular member 21 having an inserting portion 211 and at least a lower connecting hole 212 formed at a surrounding wall of the inserting portion 211, wherein the inserting portion 211 of the lower tubular member 21 is slidably inserted into the receiving portion 111 of the upper tubular member 11 at a position that the upper and lower connecting holes 112, 212 are coaxially aligned with each other.

Accordingly, two corresponding upper connecting holes 112 are formed at the surrounding wall of the receiving portion 111 of the upper tubular member 11 at the opposite sides thereof such that the upper connecting holes 112 are coaxially aligned with each other. Likewise, two corresponding lower connecting holes 212 are formed at the surrounding wall of the inserting portion 211 of the lower tubular member 21 at the opposite sides thereof such that the lower connecting holes 112 are coaxially aligned with each other. Therefore, when the inserting portion 211 of the lower tubular member 21 is slidably inserted into the receiving portion 111 of the upper tubular member 11, the upper and lower connecting holes 112, 212 are coaxially aligned with each other to form a fastening channel.

The bed support 30 comprises at least a longitudinal supporting member 31. As shown in FIG. 1, two upper supporting frames 10 are provided that each of the upper supporting frames 10 has an inverted U-shape defining two upper tubular member 11. The lower supporting frame 20 comprises four lower tubular members 21, wherein the inserting portions 211 of four lower tubular members 21 are slidably inserted into the receiving portions 111 of four upper tubular members 11 respectively. It is worth mentioning that the lower tubular member 21 is downwardly and vertically extended from the upper tubular member 11.

Accordingly, the upper and lower tubular members 11, 21 have the same diameter D, wherein the receiving portion 111 of the upper tubular member 11 has the same diameter D. A diameter d of the inserting portion 211 of the lower tubular member 21 is slightly smaller than the diameter D of the receiving portion 111 of the upper tubular member 11 for enabling the inserting portion 211 of the lower tubular member 21 to be slidably inserted into the receiving portion 111 of the upper tubular member 11. In addition, after the inserting portion 211 of the lower tubular member 21 is inserted into the receiving portion 111 of the upper tubular member 11, the inserting portion 211 of the lower tubular member 21 can be rotated within the receiving portion 111 of the upper tubular member 11 to coaxially align the upper connecting hole 112 with the lower connecting hole 212.

Preferably, two spaced apart upper connecting holes 112 are formed at the receiving portion 111 of the upper tubular member 11 and two spaced apart lower connecting holes 212 are formed at the inserting portion 211 of the lower tubular member 21, such that when the inserting portion 211 of the lower tubular member 21 is slidably inserted into the receiving portion 111 of the upper tubular member 11, the upper connecting holes 112 are coaxially aligned with the lower connecting holes 212 respectively.

Accordingly, two longitudinal supporting members 31 are extended between the two upper supporting frames 10 at the upper tubular members 11 thereof, wherein the bed support 30 further comprises a transverse bedding frame 32 extended between the longitudinal supporting members 31 for supporting a mattress on the bedding frame 32.

Figure 3:
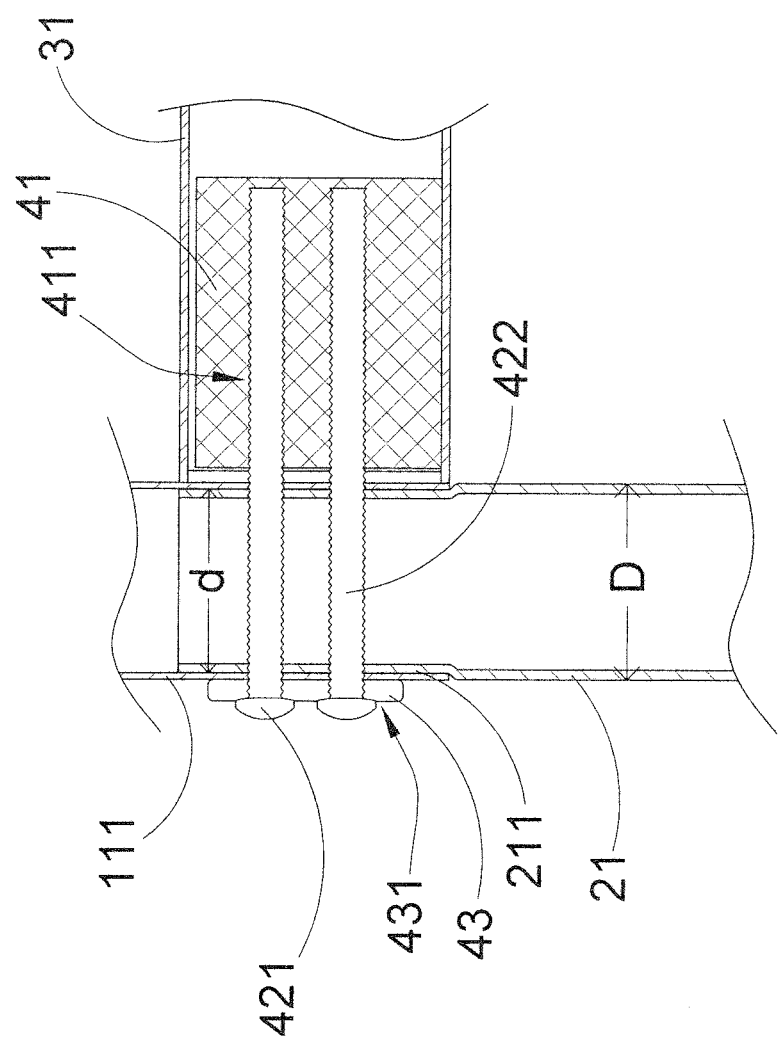
FIG. 3 is a sectional view of the joint arrangement according to the above preferred embodiment of the present invention, illustrating a locked position of the joint arrangement.

As shown in FIGS. 1 to 3, the bed frame further comprises a joint arrangement 40 for securely connecting the upper supporting frame 10, the lower supporting frame 20, and the bed support 30 all together. The joint arrangement 40 comprises a frame locker 41 provided at an end of the longitudinal supporting member 31 and an elongated fastener 42 extended through the upper and lower connecting holes 112, 212 to securely fasten with the frame locker 41 so as to securely lock up the upper tubular member 11, the lower tubular member 21, and the longitudinal supporting member 31 together.

As shown in FIGS. 2 and 3, the frame locker 41, having a block shape, has at least a locker hole 411 coaxially aligned with the upper and lower connecting holes 112, 212 when the longitudinal supporting member 31 is extended from the upper receiving portion 111 of the upper tubular member 11, such that the elongated fastener 42 is securely engaged with the locker hole 411 through the upper and lower connecting holes 112, 212. It is worth mentioning that the locker hole 411 is a threaded hole.

Preferably, two locker holes 411 are spacedly formed at the frame locker 41 to align with the pair of the upper and lower connecting holes 112, 212 respectively, wherein two elongated fasteners 42 are preferably used for coupling at the locker holes 411 of the frame locker 41 respectively, so as to provide a further securing engagement among the upper tubular member 11, the lower tubular member 21, and the longitudinal supporting member 31.

The elongated fastener 42 comprises an enlarged fastening head 421 and an elongated threaded body 422, having a tapered free end, extended from the fastening head 421, wherein when the elongated fastener 42 is longitudinally extended through the upper and lower connecting holes 112, 212, the fastening head 421 is biased against the surrounding wall of the receiving portion 111 of the upper tubular member 11 while the threaded body 422 is extended through the upper and lower connecting holes 112, 212 to engage with the locker hole 411 of the frame locker 41. Therefore, the elongated fastener 42 not only fastens the lower supporting frame 20 with the upper supporting frame 10 but also fastens the bed support 30 with the upper and lower supporting frames 10, 20 at the same time.

It is worth mentioning that once the elongated fastener 42 extends through the upper and lower connecting holes 112, 212, the upper and lower supporting frames 10, 20 are locked up with each other to prevent any rotational movement thereof. At the same time, when the elongated fastener 42 is locked with the frame locker 41, a compression force is generated therebetween. Therefore, the surrounding wall of the receiving portion 111 of the upper tubular member 11 is pressed against and sandwiched between the fastening head 421 and the end of the longitudinal supporting member 31, so as to minimize the clearance between the upper and lower supporting frames 10, 20 and the clearance between the upper tubular member 11 and the longitudinal supporting member 31. In other words, the locking structure of the joint arrangement 40 will prevent any unwanted movement among the upper supporting frame 10, the lower supporting frame 20, and the bed support 30.

As shown in FIG. 2, since the receiving portion 111 of the upper tubular member 11 has a tubular shape with a circular cross section, the surrounding wall thereof has a predetermined curvature. In order to couple the end of the longitudinal supporting member 31 at the surrounding wall of the receiving portion 111 of the upper tubular member 11, the end of the longitudinal supporting member 31 is formed in an arc configuration. In particular, the longitudinal supporting member 31 has an arc-shaped end surface 311 coupled at the surrounding wall of the receiving portion 111 of the upper tubular member 11 by the frame locker 41 and the elongated fastener 42. Accordingly, the end surface 311 of the longitudinal supporting member 31 has a curvature matching with the curvature of the surrounding wall of the receiving portion 111 of the upper tubular member 11.

According to the preferred embodiment, the longitudinal supporting member 31 has a tubular shape with a rectangular cross section, wherein the end surface 311 of the longitudinal supporting member 31 forms a rectangular rim having two vertical edges and two horizontal edges. The two horizontal edges of the longitudinal supporting member 31 at the end surface 311 thereof are two curved edges with the curvature matching the curvature of the surrounding wall of the receiving portion 111 of the upper tubular member 11.

The frame locker 41 is positioned behind the end surface 311 of the longitudinal supporting member 31, i.e. behind the two curved edges thereof, such that when the end surface 311 of the longitudinal supporting member 31 is biased against the surrounding wall of the receiving portion 111 of the upper tubular member 11, the frame locker 41 is supported close to the surrounding wall of the receiving portion 111 of the upper tubular member 11 so as to align the locker hole 411 with the upper and lower connecting holes 112, 212.

According to the preferred embodiment, the joint arrangement 40 further comprises a locking washer 43 having at least a washer hole 431 being biased against the surrounding wall of the receiving portion 111 of the upper tubular member 11 by the elongated fastener 42 to align the washer hole 431 with the upper and lower connecting holes 112, 212.

The locking washer 43 is made of slightly deformable material, such as plastic, wherein the locking washer 43 is sandwiched between the fastening head 421 and the surrounding wall of the receiving portion 111 of the upper tubular member 11. Accordingly, the threaded body 422 of the elongated fastener 42 is rotatably engaged with the locker hole 411 of the frame locker 41. When the fastening head 421 of the elongated fastener 42 is pressed against the locking washer 43, the locking washer 43 is slightly deformed by the compression force, so as to prevent the elongated fastener 42 being rotated to disengage the threaded body 422 with the locker hole 411. Furthermore, the locking washer 43 can prevent any clearance formed between the fastening head 421 and the surrounding wall of the receiving portion 111 of the upper tubular member 11.

Preferably, two washer holes 431 are spacedly formed at the locking washer 43, wherein the two washer holes 431 are aligned with the two upper connecting holes 112, and the two lower connecting holes 212 respectively, such that two elongated fasteners 42 are extended through the two washer holes 431 to engage with the two locker holes 411 of the frame locker 41 respectively, as shown in FIGS. 2 and 3.

According to the preferred embodiment, the frame locker 41 and the longitudinal supporting member 31 are made of same material, such as metal, to enhance the rigidity of the bed support 30. Preferably, the frame locker 41 is permanently affixed at the end of the longitudinal supporting member 31 by welding.

Figure 4:
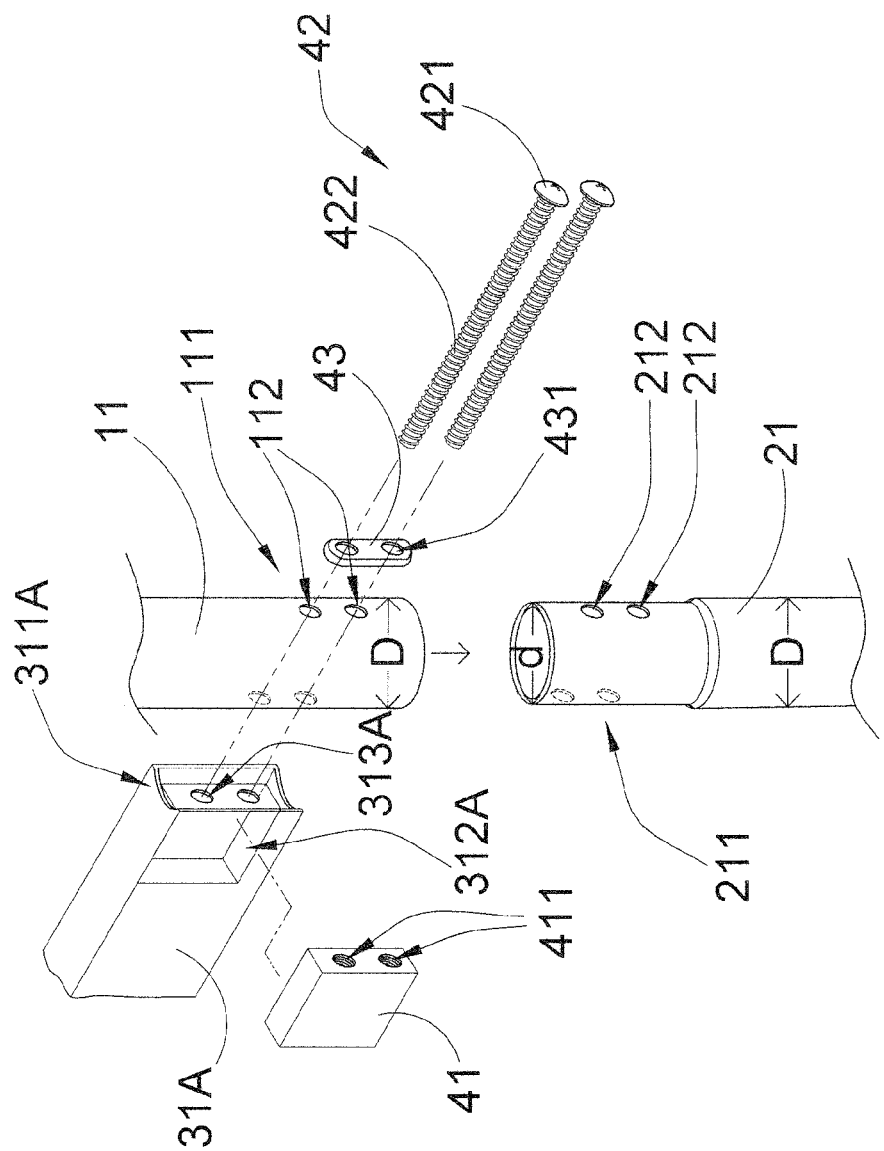
FIG. 4 is an alternative mode of the longitudinal supporting member of the bed support according to the above preferred embodiment of the present invention.

Alternatively, the frame locker 41 and the longitudinal supporting member 31A can be made of different materials. For example, the longitudinal supporting member 31A can be made of wood and the frame locker 41 can be made of metal. FIG. 4 illustrates the alternative mode of the longitudinal supporting member 31A to incorporate with the frame locker 41. As shown in FIG. 4, the longitudinal supporting member 31A further has a receiving chamber 312A formed at a sidewall of the longitudinal supporting member 31A, wherein the frame locker 41 is detachably disposed at the receiving chamber 312A. Accordingly, the frame locker 41 is positioned behind the end surface 311A of the longitudinal supporting member 31A.

The longitudinal supporting member 31A further has at least a guiding hole 313A formed at a front wall of the receiving chamber 312A to coaxially align with the upper and lower connecting holes 112, 212, wherein the frame locker 41 is detachably received in the receiving chamber 312A to engage with the elongated fastener 42 through to the guiding hole 313A. It is worth mentioning that the front wall of the receiving chamber 312A is located behind the end surface 311A of the longitudinal supporting member 31A. Therefore, when the frame locker 41 is disposed in the receiving chamber 312A, the elongated fastener 42 is extended through the washer hole 431, the upper connecting hole 112, the lower connecting hole 212, and the guiding hole 313A in order to engage with the locker hole 411 of the frame locker 41. It is worth mentioning that preferably, two guiding holes 313A are spacedly formed at the front wall of the receiving chamber 312A when two elongated fasteners 42 are used. It is worth mentioning that the feature of the longitudinal supporting member 31A with the receiving chamber 312A enables the frame locker 41 and the longitudinal supporting member 31A to be made of different materials or same material.

According to the preferred embodiment, the bed frame of the present invention is configured to form a bunk bed. Accordingly, the bed frame further comprises a lower bed support 50 coupled at the lower supporting frame 20 at a position below the bed support 30, wherein the bed support 30 and the lower bed support 50 form a bunk bed configuration. The bed support 30 forms an upper bed support to be located above the lower bed support 50.

It is appreciated that the lower bed support 50 can be mounted to the lower tubular member 21 of the lower supporting frame 20 via the joint arrangement 40. For example, the joint arrangement 40 can fasten among the lower bed support 50, the lower tubular member 21 of the lower supporting frame 20, and a tubular ground member of a ground supporting frame. It is worth mentioning that the joint arrangement 40 should be used for the bed support 30 as the upper bed support because the bed support 30 is the upper deck far away from the ground surface. When the user sleeps on the bed support 30, the movement of the user will cause the bed frame to be wobbled. Therefore, the joint arrangement 40 can substantially reduce minimize the clearance at the connecting point among the upper tubular member 11, the lower tubular member 21, and the bed support 30 for preventing any wobbling movement of the bed frame due to the clearance. In fact, the joint arrangement 40 can substantially evenly distribute the force from the bed support 30 to the upper and lower supporting frames 10, 20.

It is worth mentioning that the lower tubular member 21 is fastened with both the bed support 30 and the lower bed support 50 in one single tubular structure. Unlike the conventional bunk bed structure, a joint is formed at the supporting post between the upper and lower deck frames, which will create the clearance at the joint and will weaken the rigidity of the supporting post. There is no connection or assembling structure at the lower tubular member 21 of the present invention between the bed support 30 and the lower bed support 50. Therefore, the lower tubular member 21 will provide a rigid supporting structure to support the bed support 30 and the lower bed support 50.

It is worth mentioning that the joint arrangement 40 of the present invention can also incorporate with the single deck bed frame, i.e. the regular bed, wherein the joint arrangement 40 can couple among the upper tubular member 11 as the head broad structure, the lower tubular member 21 as the ground support structure, and the bed support 30.

In order to assemble the bed frame of the present invention, the user is able to couple the lower bed frame 50 with the lower tubular members 21 of the lower supporting frame 20 such that the lower tubular members 21 are retained and locked at the corners of the lower bed frame 50. Then, the user is able to slidably insert the inserting portions 211 of the lower tubular members 21 is into the receiving portions 111 of the upper tubular members 11, such that the upper and lower connecting holes 112, 212 are coaxially aligned with each other. Each of the longitudinal supporting members 31 can be installed between the two upper supporting frames 10 at a position that one end surface 311 of the longitudinal supporting member 31 is engaged with the surrounding wall of the receiving portion 111 of one of the upper tubular member 11 while another end surface 311 of the longitudinal supporting member 31 is engaged with the surrounding wall of the receiving portion 111 of the other upper tubular member 11. The elongated fasteners 42 can be extended through the upper and lower connecting holes 112 to engage with the locker holes 411 of the frame locker 41 in order to lock up upper tubular member 11, the lower tubular member 21, and the bed support 30 together.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A bed frame, comprising:

an upper supporting frame which comprises an upper tubular member having a receiving portion and at least an upper connecting hole formed at a surrounding wall of said receiving portion;

a lower supporting frame which comprises a lower tubular member having an inserting portion and at least a lower connecting hole formed at a surrounding wall of said inserting portion, wherein said inserting portion of said lower tubular member is slidably inserted into said receiving portion of said upper tubular member at a position that said upper and lower connecting holes are coaxially aligned with each other;

a bed support comprising a longitudinal supporting member; and a joint arrangement which comprises a frame locker provided at an end of said longitudinal supporting member and an elongated fastener extended through said upper and lower connecting holes to securely fasten with said frame locker so as to securely lock up said upper tubular member, said lower tubular member, and said longitudinal supporting member together.

2. The bed frame, as recited in claim 1, wherein said frame locker has at least a locker hole coaxially aligned with said upper and lower connecting holes, such that said elongated fastener is securely engaged with said locker hole through said upper and lower connecting holes.

3. The bed frame, as recited in claim 2, wherein said elongated fastener comprises an enlarged fastening head and an elongated threaded body extended from said fastening head, wherein said threaded body is extended through said upper and lower connecting holes to engage with said locker hole of said frame locker.

4. The bed frame, as recited in claim 1, wherein said longitudinal supporting member has an arc-shaped end surface coupled at said surrounding wall of said receiving portion of said upper tubular member by said frame locker and said elongated fastener, wherein said end surface of said longitudinal supporting member has a curvature matching with a curvature of said surrounding wall of said receiving portion of said upper tubular member.

5. The bed frame, as recited in claim 3, wherein said longitudinal supporting member has an arc-shaped end surface coupled at said surrounding wall of said receiving portion of said upper tubular member by said frame locker and said elongated fastener, wherein said end surface of said longitudinal supporting member has a curvature matching with a curvature of said surrounding wall of said receiving portion of said upper tubular member.

6. The bed frame, as recited in claim 4, wherein said frame locker is positioned behind said arc-shaped end surface of said longitudinal supporting member.

7. The bed frame, as recited in claim 5, wherein said frame locker is positioned behind said arc-shaped end surface of said longitudinal supporting member.

8. The bed frame, as recited in claim 1, wherein a diameter of said inserting portion of said lower tubular member is slightly smaller than a diameter of said receiving portion of said upper tubular member for enabling said inserting portion of said lower tubular member to be slidably inserted into and rotated within said receiving portion of said upper tubular member, so as to coaxially align said upper connecting hole with said lower connecting hole.

9. The bed frame, as recited in claim 3, wherein a diameter of said inserting portion of said lower tubular member is slightly smaller than a diameter of said receiving portion of said upper tubular member for enabling said inserting portion of said lower tubular member to be slidably inserted into and rotated within said receiving portion of said upper tubular member, so as to coaxially align said upper connecting hole with said lower connecting hole.

10. The bed frame, as recited in claim 7, wherein a diameter of said inserting portion of said lower tubular member is slightly smaller than a diameter of said receiving portion of said upper tubular member for enabling said inserting portion of said lower tubular member to be slidably inserted into and rotated within said receiving portion of said upper tubular member, so as to coaxially align said upper connecting hole with said lower connecting hole.

11. The bed frame, as recited in claim 1, wherein said joint arrangement further comprises a locking washer having at least a washer hole being biased against said surrounding wall of said receiving portion of said upper tubular member by said elongated fastener to align said washer hole with said upper and lower connecting holes.

12. The bed frame, as recited in claim 7, wherein said joint arrangement further comprises a locking washer having at least a washer hole being biased against said surrounding wall of said receiving portion of said upper tubular member by said elongated fastener to align said washer hole with said upper and lower connecting holes.

13. The bed frame, as recited in claim 10, wherein said joint arrangement further comprises a locking washer having at least a washer hole being biased against said surrounding wall of said receiving portion of said upper tubular member by said elongated fastener to align said washer hole with said upper and lower connecting holes.

14. The bed frame, as recited in claim 1, wherein said frame locker is permanently affixed at said end of said longitudinal supporting member.

15. The bed frame, as recited in claim 13, wherein said frame locker is permanently affixed at said end of said longitudinal supporting member.

16. The bed frame, as recited in claim 1, wherein said longitudinal supporting member further has a receiving chamber formed at a sidewall of said longitudinal supporting member and has at least a guiding hole formed at a front wall of said receiving chamber to coaxially align with said upper and lower connecting holes, wherein said frame locker is detachably received in said receiving chamber to engage with said elongated fastener through said guiding hole.

17. The bed frame, as recited in claim 13, wherein said longitudinal supporting member further has a receiving chamber formed at a sidewall of said longitudinal supporting member and has at least a guiding hole formed at a front wall of said receiving chamber to coaxially align with said upper and lower connecting holes, wherein said frame locker is detachably received in said receiving chamber to engage with said elongated fastener through said guiding hole.

18. The bed frame, as recited in claimed in claim 1, further comprising a lower bed support coupled at said lower supporting frame at a position below said bed support, wherein said bed support and said lower bed support form a bunk bed configuration.

19. The bed frame, as recited in claimed in claim 15, further comprising a lower bed support coupled at said lower supporting frame at a position below said bed support, wherein said bed support and said lower bed support form a bunk bed configuration.

20. The bed frame, as recited in claimed in claim 17, further comprising a lower bed support coupled at said lower supporting frame at a position below said bed support, wherein said bed support and said lower bed support form a bunk bed configuration.

* * * * *